United States Patent
Waters (10) Patent No.: US 6,546,590 B2
(45) Date of Patent: Apr. 15, 2003

(54) AUTOMATIC ATTACHABLE SIDE-VIEW MIRROR CLEANING DEVICE

(76) Inventor: Gary Waters, 1296 E. Gibson #245, Woodland, CA (US) 95776

( * ) Notice: Subject to any disclaimer, the term of this patent is extended or adjusted under 35 U.S.C. 154(b) by 3 days.

(21) Appl. No.: 09/773,226

(22) Filed: Jan. 31, 2001

(65) Prior Publication Data

US 2002/0100136 A1 Aug. 1, 2002

(51) Int. Cl.[7] ................ B60S 1/56; B60S 1/46
(52) U.S. Cl. ............ 15/250.003; 15/250.29; 15/250.26; 15/250.01; 318/483; 318/DIG. 2
(58) Field of Search .......... 15/250.29, 250.003, 15/250.24, 250.37, 250.002, 250.01, 250.26; 318/483, DIG. 2

(56) References Cited

U.S. PATENT DOCUMENTS

| | | | | |
|---|---|---|---|---|
| 1,162,122 A | * | 11/1915 | Yamada et al. | 15/250.22 |
| 2,829,394 A | * | 4/1958 | Brigmon | 15/250.22 |
| 3,526,920 A | * | 9/1970 | Boyanich | 15/250.003 |
| 3,618,156 A | * | 11/1971 | Riggs | 15/250.003 |
| 3,855,662 A | | 12/1974 | Fortin | 15/250.002 |
| 3,968,537 A | | 7/1976 | Wagenhofer | 15/250.003 |
| 4,339,169 A | | 7/1982 | Addison, Jr. | 15/250.003 |
| 4,527,301 A | | 7/1985 | Seitz | 15/250.003 |
| 4,896,395 A | | 1/1990 | Bissell | 15/250.003 |
| D325,718 S | | 4/1992 | Dettling | D12/188 |
| D328,275 S | | 7/1992 | Nelson et al. | D12/188 |
| 5,179,758 A | * | 1/1993 | Smith et al. | 15/250.003 |
| 5,522,112 A | * | 6/1996 | Tiffany | 15/250.003 |
| 5,634,234 A | | 6/1997 | Allain | 15/250.003 |
| 5,924,161 A | | 7/1999 | Miller | 15/250.003 |
| D420,315 S | | 2/2000 | Hardy | D12/188 |
| 6,216,308 B1 | * | 4/2001 | Duncan | 15/250.24 |

* cited by examiner

Primary Examiner—Gary K. Graham
(74) Attorney, Agent, or Firm—John D. Gugliotta; P. Jeff Martin (57) ABSTRACT

An automatic attachable side-view mirror cleaning device is provided for cleaning the side-view mirrors on tractor-trailer rigs. Utilizing a rubber squeegee blade, similar to that used on windshield wipers, the blade travels up and down the long, thin mirror of a tractor-trailer rig. The squeegee scraper blade utilizes two vertical tracks which reside on the two exterior sides of the mirror and is powered by a small electric motor located under the dashboard. Additionally, washer solvent is directed at the mirror using a small pump, through jets at the top of the mirror. The solvent system would be tapped into the main solvent system of the truck using small diameter plastic tubing. The controls for both the electric drive motor and the solvent pump would be located in a dash-mounted panel inside the cab. The invention would be made available as a factory option on new trucks as well as be made available as an after-market attachment accessory for do-it-yourself installation. The device would be suitable for installation on either the right, left, or both sides of the vehicle.

12 Claims, 6 Drawing Sheets

AUTOMATIC ATTACHABLE SIDE-VIEW MIRROR CLEANING DEVICE

RELATED APPLICATIONS

The present invention was first described in Disclosure Document No. 479,332 filed on Sep. 5, 2000. There are no previously filed, nor currently any co-pending applications, anywhere in the world.

BACKGROUND OF THE INVENTION

1. Field of the Invention

The present invention relates generally to cleaning devices for surfaces such as windows, mirrors, headlights and the like, and, more particularly, to such a device adaptable as an automatic attachable side-view mirror cleaning device.

2. Description of the Related Art

Everyone realizes the importance of maintaining clean windshields and mirrors with regards to driving safety. While wiper systems are readily available for windshields and even some rear windows of vehicles, side-view mirrors are left on their own. This forces the driver to manually clean these mirrors which can be difficult, especially when driving in heavy rain or snow. For truck drivers, this problem is more severe for several reasons. First, these side view mirrors are all they have to rely on, since they do not have a rear-view mirror. Second, these mirrors are high off of the ground, making it difficult to clean them when stopped at a truck stop. Finally, stopping to repeatedly clean these mirrors, cuts into their profits due to the increased travel time.

Accordingly, the need has arisen for a means by which side-view mirrors on trucks and other large vehicles can be easily cleaned in a quick, easy and effective manner, thus improving driving safety for all on the road. The development of the automatic attachable side-view mirror cleaning device fulfills this need.

A search of the prior art did not disclose any patents that read directly on the claims of the instant invention; however, the following references were considered related. The following patents disclose the design and function of a wiping device for external rearview mirrors on vehicles: U.S. Pat. No. 5,924,161 issued in the name of Miller; U.S. Pat. No. 5,634,234 issued in the name of Allain; U.S. Pat. No. 4,527,301 issued in the name of Seitz; U.S. Pat. No. 4,339,169 issued in the name of Addison, Jr.; U.S. Pat. No. 3,968,537 issued in the name of Wagenhofer, U.S. Pat. No. 3,618,156 issued in the name of Riggs; U.S. Pat. No. D 420,315 issued in the name of Hardy; U.S. Pat. No. D 328,275 issued in the name of Nelson et al.; and U.S. Pat. No. D 325,718 issued in the name of Dettling.

U.S. Pat. No. 4,896,395 issued in the name of Bisssell describes a rearview mirror wiper attachment.

U.S. Pat. No. 3,855,662 issued in the name of Fortin discloses a wiper device for vehicle headlamps.

Consequently, a need has been felt for providing a device which allows for side-view mirrors on trucks and other large vehicles to remain clean, thus saving time for the driver, but more importantly, providing for safer travel.

SUMMARY OF THE INVENTION

Therefore, it is an object of the present invention to provide a vehicle side mirror wiper system which cleans side-view mirrors on trucks and other large vehicles automatically.

It is another object of the present invention to provide a vehicle side mirror squeegee/scraper system which is operated by electric control switches inside of the vehicle while driving.

It is another object of the present invention to provide a vehicle side mirror squeegee/scraper system which prevents the accumulation of snow and/or frost.

It is another object of the present invention to provide a vehicle side mirror squeegee/scraper system which is especially advantageous when vehicles are stored outside overnight.

It is another object of the present invention to provide a vehicle side mirror squeegee/scraper system which is safer and saves time.

It is another object of the present invention to provide a vehicle side mirror squeegee/scraper system which eliminates obstructed rearward or side vision.

It is another object of the present invention to provide a squeegee blade which cleans in an up and down manner.

It is another object of the present invention to provide a squeegee blade which resides between two vertical tracks.

It is another object of the present invention to provide a squeegee blade which scrapes off rain, snow, and debris like windshield wipers.

It is another object of the present invention to provide solvent spray which is applied through jets located at a top of the side view mirror.

It is another object of the present invention to provide solvent spray which either taps into a conventional solvent tank, or alternately a separate, dedicated solvent tank.

It is another object of the present invention to provide solvent spray which is controlled by a small solvent pump.

It is another object of the present invention to provide solvent spray which aids in removing tough debris.

It is another object of the present invention to provide a vehicle side mirror squeegee/scraper system which is not only perfect for large truck mirrors, but also for busses and vans as well.

It is another object of the present invention to provide a vehicle side mirror squeegee/scraper system that could also be made available as an aftermarket add-on for do-it-yourselfers.

Briefly described according to one embodiment of the present invention, an automatic attachable side-view mirror cleaning device is provided for cleaning the side-view mirrors on tractor-trailer rigs. The invention utilizes a rubber squeegee blade, similar to that used on windshield wipers, which travels up and down the long, thin mirror of a tractor-trailer rig. The squeegee scraper blade utilizes two vertical tracks which reside on the two exterior sides of the mirror and is powered by a small electric motor located under the dashboard. Additionally, washer solvent is directed at the mirror using a small pump, through jets at the top of the mirror. The solvent system would be tapped into the main solvent system of the truck using small diameter plastic tubing. The controls for both the electric drive motor and the solvent pump would be located in a dash-mounted panel inside the cab. The invention would be made available as a factory option on new trucks as well as be made available as an after-market attachment accessory for do-it-yourself installation. The device would be suitable for installation on either the right, left, or both sides of the vehicle.

The use of the present invention allows for side-view mirrors on trucks and other large vehicles to remain clean, thus saving time for the driver, but more importantly, providing for safer travel.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Referring now to FIGS. 1–7, an automatic attachable side-view mirror cleaning device 10 is shown, according to the present invention, comprised of a track assembly 20, a squeegee blade 40, a reversible 12 volt DC motor 60, and a moisture sensor 70.

Figure 1:
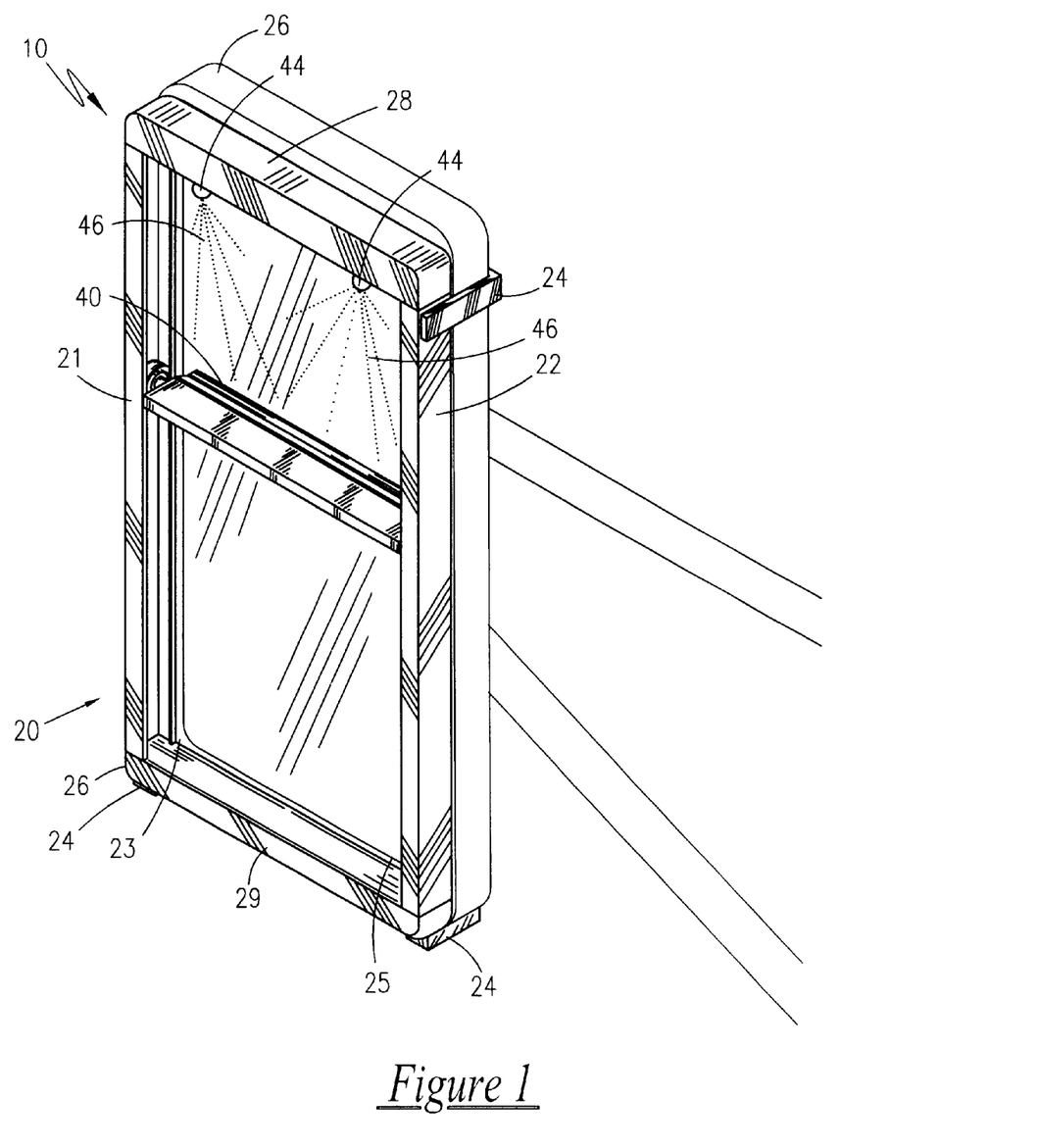
FIG. 1 is a perspective view of an automatic attachable side-view mirror cleaning device according to the preferred embodiment of the present invention.

The track assembly 20 includes a pair of linearly elongated, vertically extending track members 21, 22 adapted so as to be mounted to side-view mirrors 15 of a tractor-trailer rig 12 via locking clamps 24 or by other suitable attachment means such as bolts. A first track member 21 and a second track member 22 are preferably fabricated of rigid aluminum coated with an anti-corrosive material. The first track member 21 and the second track member 22 are aligned parallel with respect to each other.

The locking clamps 24 are located at ends of each track member 21, 22 and are designed and configured so as to be mounted to corners 26 of the side view mirror 15.

A linearly elongated, hollow, rectangular jet support member 28 is mounted perpendicularly between inner sidewalls 23, 25 of the track members 21, 22 respectively, near an upper end thereof and provides a means for supporting a pair of jets 44 (to be described in greater detail below). A linearly elongated lower member 29 is mounted perpendicularly between inner sidewalls 23, 25 at an end opposite to the jet support member 28, thereby forming a rectangular frame for enclosing the squeegee blade 40.

Figure 2:
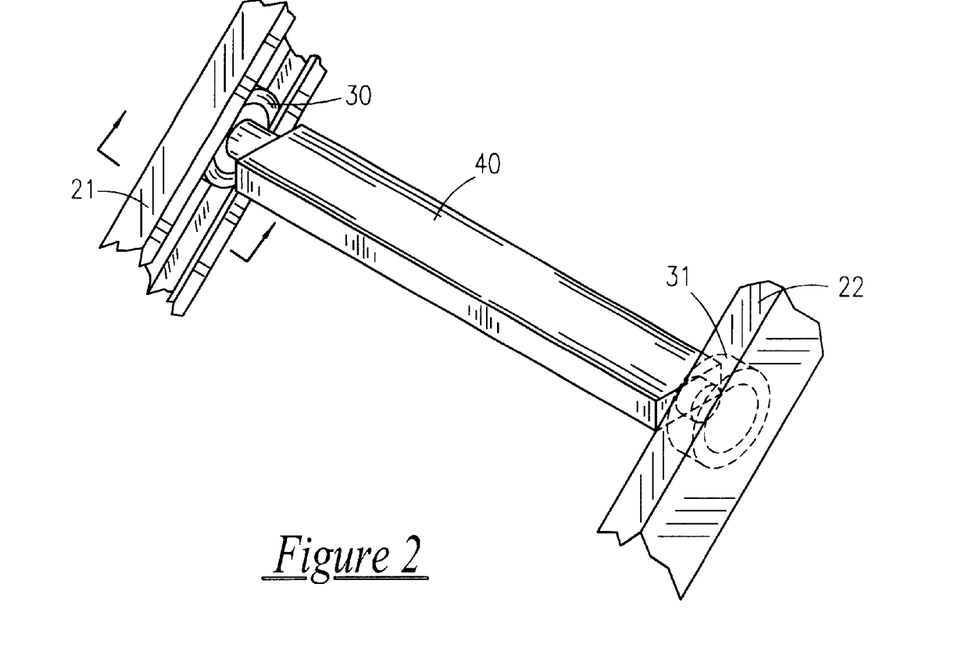
FIG. 2 is a partial front side elevational view of the track assembly according to the preferred embodiment of the present invention.
Figure 4:
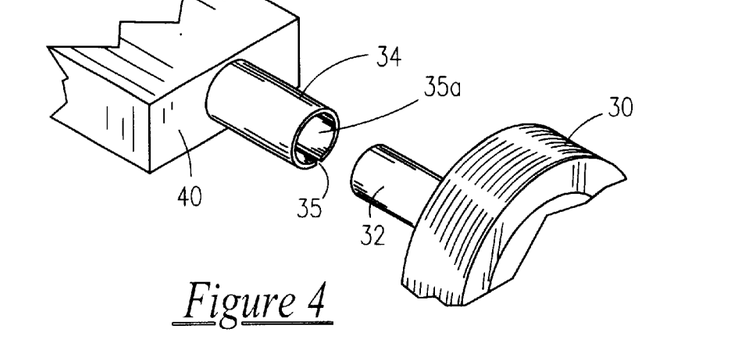
FIG. 4 is a partial exploded perspective view of the squeegee blade and guide roller according to the preferred embodiment of the present invention.

The track assembly 20 is further defined as having a pair of guide rollers 30 and 31, wherein a first guide roller 30 is rotatably mounted within a track guide 32 of track member 21, and a second guide roller 31 is rotatably mounted within a track guide 32 of track member 22, the second guide roller 31 is mounted opposite to the first guide roller 30 along a horizontal axis defined by the axle 32 and the squeegee blade 40. Each guide roller 30 and 31 includes an axle 32 adapted for allowing an end of a squeegee blade 40 to be attached or detached in a snap-secure manner.

The squeegee blade 40 is fabricated of a sponge-type material in conjunction with a rubber and is removably secured to the axles 32 of the guide rollers 30 through the provision of the squeegee blade 40 being provided with short, U-shaped blade attachment segments 34 mounted to opposed ends thereof. Each segment 34 is fabricated of a rigid plastic material, and has a diameter measuring slightly smaller than the diameter of the axles 32 of the guide rollers 30. The segments 34 are further defined as having axle receiving slots 35 formed therein which lead to a circular void 35a for insertably receiving the axles 32 therein. The segments 34 are designed so as to be frictionally received around the axles 32 in a semi-interference type fit, thereby allowing the squeegee blade 40 to be snapped on the axles 32. The design and configuration of the U-shaped segments 34 facilitate quick, easy, and simple replacement of the wiper blade 40 in the event the need should arise.

The squeegee blade 40 physically contacts a surface of the side-view mirror 15 as indicated by direction arrow 55. Longitudinal movement of the squeegee blade 40 is actuated via the reversible, DC drive motor 60 secured within the jet support member 28.

Figure 3A:
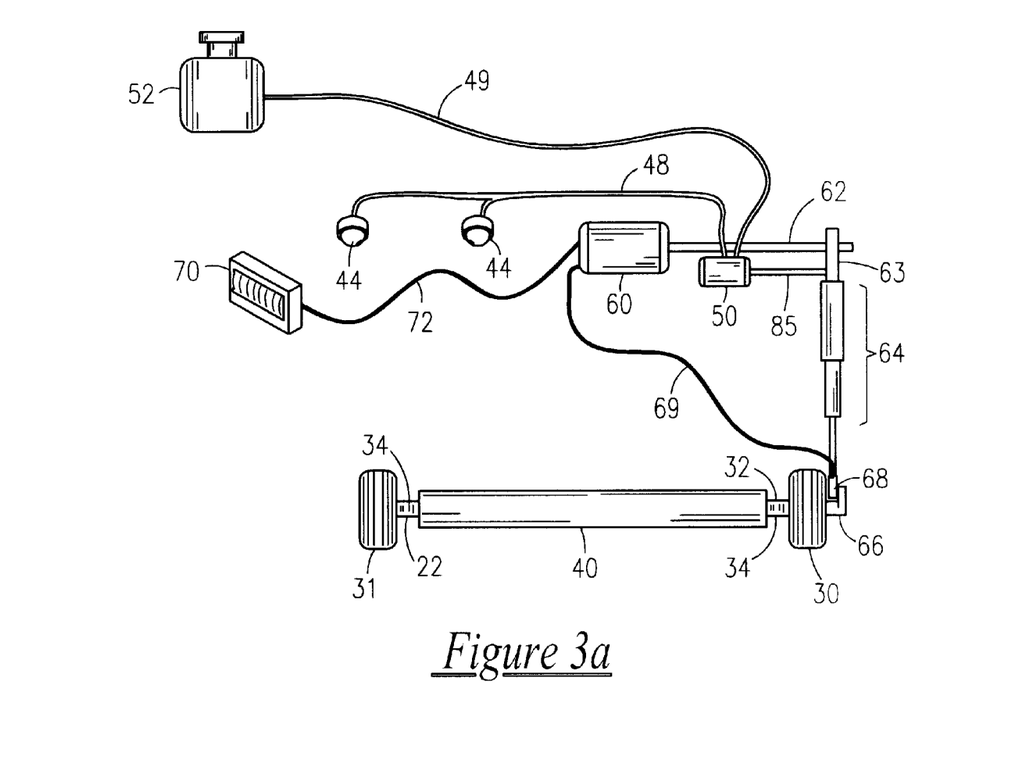
FIG. 3a is a front side elevational view of the present invention shown with the track assembly removed according to the preferred embodiment.
Figure 3B:
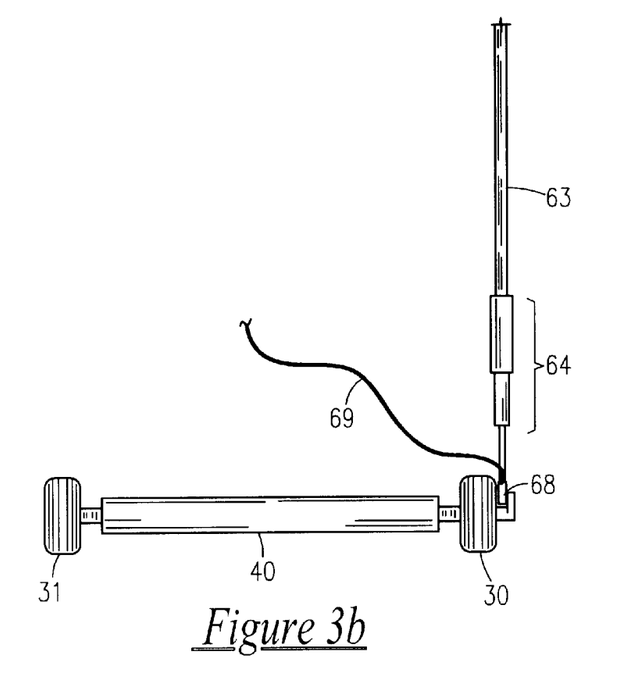
FIG. 3b is a front side elevational view of the present invention showing the driver arm in a telescoping arrangement.
Figure 3C:
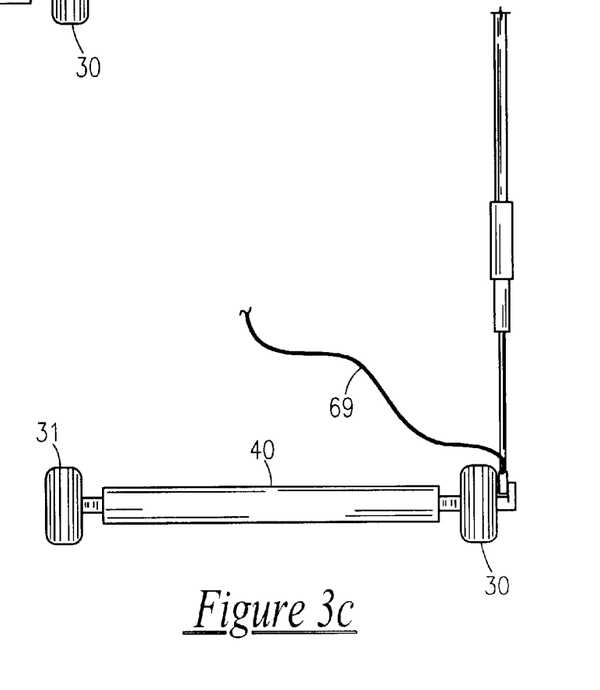
FIG. 3c is a front side elevational view of the present invention showing the driver arm retracting from the telescoping arrangement of FIG. 3b.
Figure 3D:
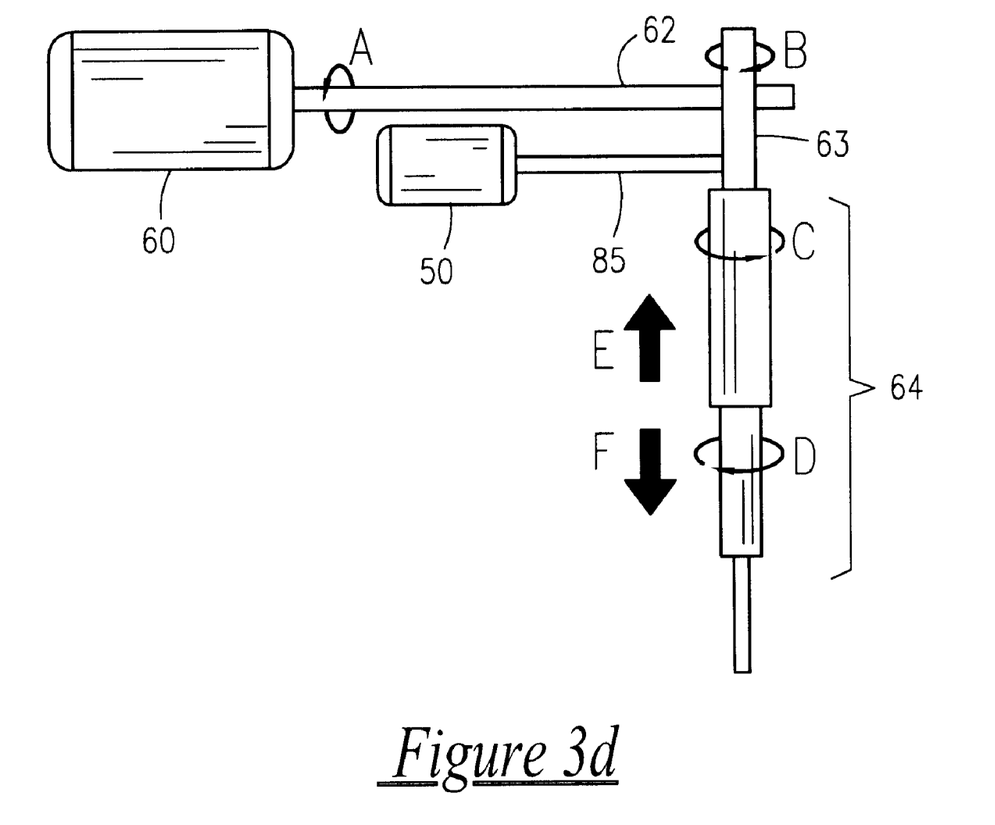
FIG. 3d is an enlarged view of FIG. 3a through FIG. 3c, illustrating the rotational relationship between the motor, the driver pin, the driver arm and the roller guide.

Referring now more specifically to FIGS. 1, 2 and 3a–3d, the motor 60 has a drive arm 62 connected via a drive pin 63 to a telescopic, rotating guide roller drive member 64, wherein the drive arm 62 thus engages and actuates rotation of the drive member 64. An upper end of the drive member 64 engages and activates a limit switch 68 which is electrically coupled to motor 60 by wiring 69. A guide roller pin 66 is rotatably mounted between guide roller 30 and an end of drive member 64 opposite drive pin 63. As best seen in FIG. 3d, the motor 60 rotates the drive arm 62 (as depicted by rotational arrow A), which then causes rotation of the drive pin 63 (as depicted by rotational arrow B). The rotation of drive pin 63 causes rotation of telescopic drive member 64. As the drive members 64 rotates, it telescopically extends in a vertical orientation so as to actuate downward movement of the squeegee blade 40 across the facial surface of the side-view mirror 15. The upper end of drive member 64 contacts limit switch 68, wherein limit switch 68 causes the drive member 64 to rotate in a reverse direction and telescopically retract, thus actuating reverse, upward movement of the squeegee blade 40.

A pair of jets 44 are adjacently mounted to an upper surface of the jet support member 28. The jets 44 spray cleaning fluid 46 in a direction with sufficient force so as to effectively coat an entire facial surface of the side-view mirror 15. The jets 44 are connected by bifurcated conduit 48 to a pump 50 which is connected by conduit 49 to a main cleaning fluid reservoir tank 52 located in the tractor-trailer rig 12.

A pump actuation rod 85, mounted at an end thereof to the drive pin 63 above the drive arm 62, and at an opposite end to pump 50, is operatively engaged by rotation of drive pin 63 so as to draw a quantity of cleaning fluid 46 from reservoir tank 52, when the drive pin 63 is rotated to actuate vertical movement of the squeegee blade 40. Via conduit 49, the cleaning fluid 46 is pumped from pump 50 and conduit 48 through jets 44, thereby emitting a spray of cleaning fluid 46 on the facial surface of the side-view mirror 15.

Figure 5:
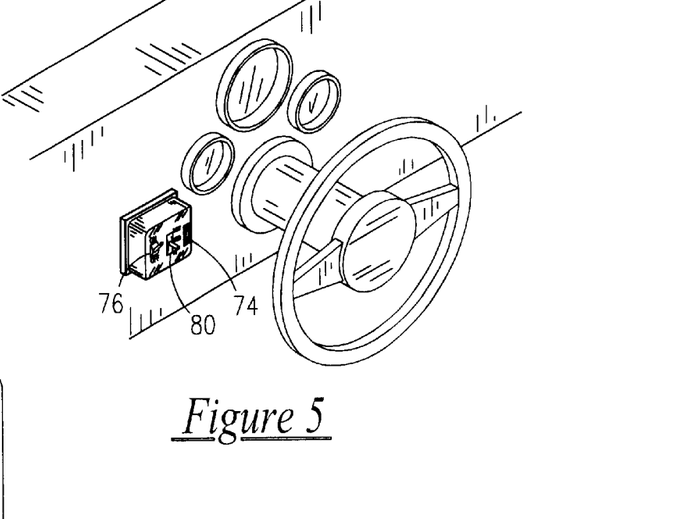
FIG. 5 is a perspective view of the on/off switch, the low, medium, high switch, and the override control switch shown mounted to a dashboard of a tractor-trailer rig according to the preferred embodiment.

Referring now to FIG. 5, an on/off switch 76 is mounted to a dashboard of the tractor-trailer rig 12 for allowing a user to manually activate and deactivate the motor 60. A low, medium, and high setting switch 80 is mounted adjacent to the on/off switch 76 for allowing the user to control speed of the longitudinal movement of the squeegee blade 40.

Figure 6:
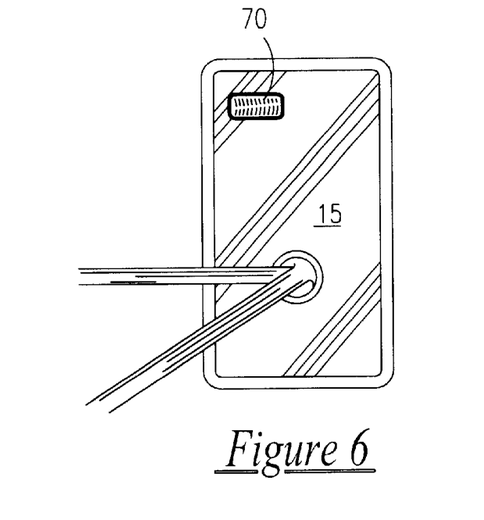
FIG. 6 is rear side elevational view of a side-view mirror showing a moisture sensor mounted to a rear side thereof.
Figure 7:
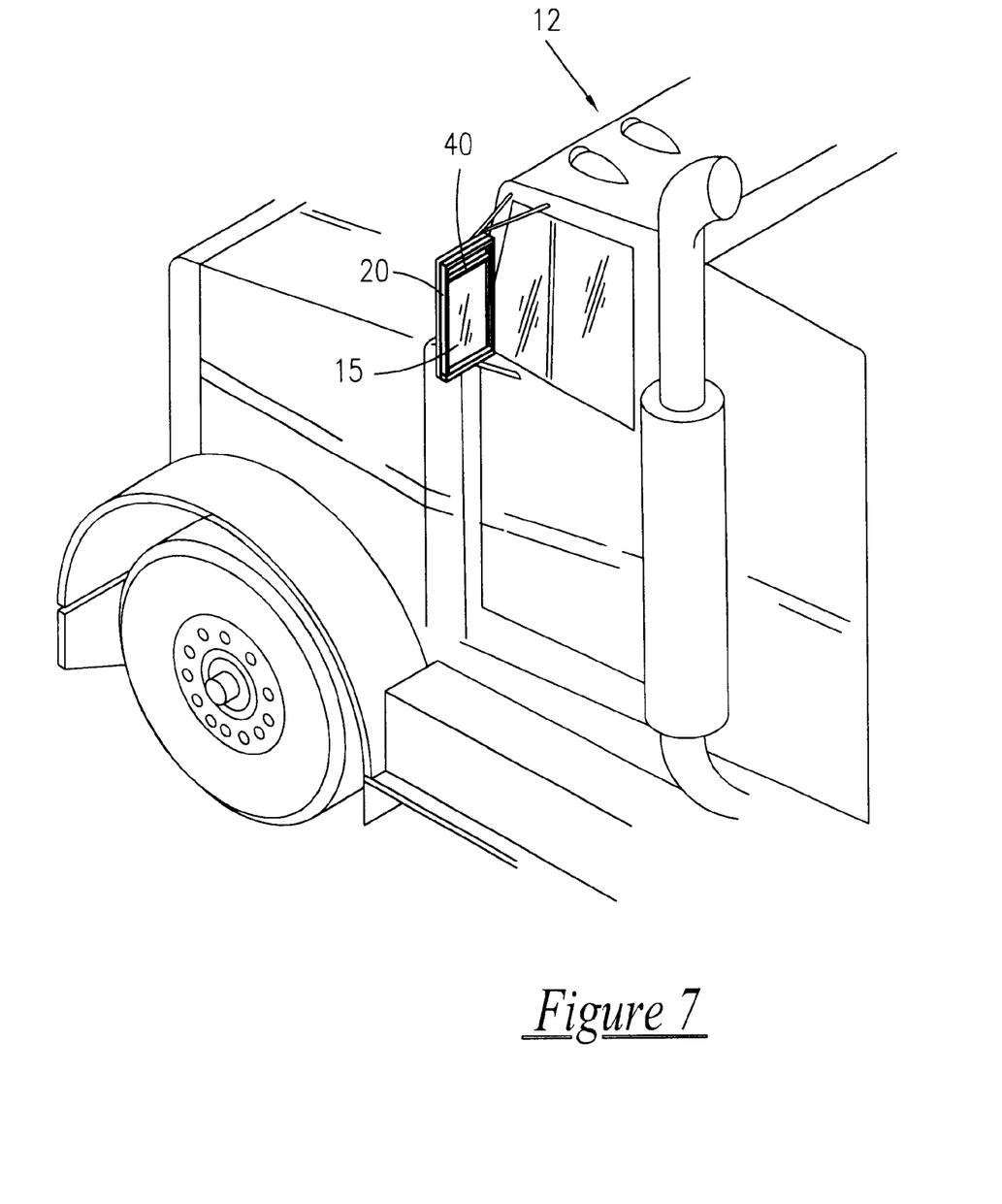
FIG. 7 is a perspective view of the present invention shown attached to a side-view mirror of a tractor-trailer rig.

Referring now to FIGS. 3, 5, and 6, a moisture sensor 70, mounted to a rear outer surface of the side-view mirror 15, is connected electrically to the motor 60 by wiring 72. The moisture sensor 70 is designed and configured so as to detect ambient moisture formed on the facial surface of the side-view mirror 15 from either excessive humidity, rain, snow, or similar moisture producing means. The moisture sensor 70 and associated electrical components automatically actuates both longitudinal movement of the squeegee blade 40 at medium speed and emission of a quantity of spray cleaning fluid 46 by the jets 44.

An override control switch 74, mounted to the dashboard, is provided so as to allow the user to deactivate motor 60, thus overriding automatic actuation of the device 10 by the moisture sensor 70.

2. Operation of the Preferred Embodiment

To use the present invention, when the moisture sensor 70 detects ambient moisture formed on the facial surface of the side-view mirror 15 of the tractor-trailer rig 12, the sensor 70 automatically actuates both longitudinal movement of the squeegee blade 40 at medium speed and emission of a quantity of spray cleaning fluid 46 by jets 44 so as to effectively clean the side-view mirror, thus saving time for the driver, but more importantly, providing for safer travel.

In the event the user desires to deactivate the device 10, the user simply depresses an override control switch 74 mounted to the dashboard of the tractor-trailer rig 12, thus effectively deactivating the electric motor 60. The user manually activates and deactivates the device 10 via an on/off switch 76 also mounted to the dashboard. In order to control the speed of the longitudinal movement of the squeegee blade 40, the user simply selects a desired speed via a low, medium, and high setting switch 80 mounted adjacent to the on/off switch 76.

The use of the present invention allows for side-view mirrors on trucks and other large vehicles to remain clean, thus not only saving time for the driver, but more importantly, providing for safer travel.

The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. By way of example, and not as a limitation, such improvements envisioned include the addition of a cover shield, for protecting and storing the sponge/squeegee material, as well as other additional improvements as to the content, orientation, or configuration of the overall apparatus. Therefore, the scope of the invention is to be broadly limited only by the following claims.

What is claimed is:

1. A side-view mirror cleaning device comprising:
   a track assembly, said track assembly having a pair of linearly elongated, vertically extending track members adapted so as to be mounted to side-view mirrors of a tractor-trailer rig, said vertically extending track members aligned parallel with respect to one another;
   a pair of guide rollers, wherein a first guide roller is rotatably mounted within a track guide of one of said track members, a second guide roller is rotatably mounted within a track guide of the other of said track members, said second guide roller mounted opposite to the first guide roller along a horizontal axis defined by an axle and a squeegee blade, said axle adapted for allowing an end of said squeegee blade to be snapped thereto; and
   said squeegee blade supported by said guide rollers for physically contacting a surface of a side-view mirror.

2. The side-view mirror cleaning device of claim 1, further comprising:
   a linearly elongated, hollow, rectangular jet support member mounted perpendicularly between inner sidewalls of said track members near an upper end thereof and providing a means supporting a pair of jets, said jets mounted to an upper surface of said jet support member, said jets for spraying cleaning fluid onto said side-view mirror.

3. The side-view mirror cleaning device of claim 2, wherein said jets are in fluid communication with a main cleaning fluid reservoir tank located in said tractor-trailer rig via a pump actuation rod, which is operatively engaged by rotation of said drive pin so as to draw a quantity of cleaning fluid from reservoir tank and then direct the cleaning fluid from said pump through said jets.

4. The side-view mirror cleaning device of claim 3, further comprising a moisture sensor connected electrically to said motor so as to detect ambient moisture formed on a facial surface of a side-view mirror, thereby automatically actuating said motor and actuating movement of said squeegee blade and release of cleaning fluid from said jets.

5. The side-view mirror cleaning device of claim 1, further comprising:
   a motor in physical communication with said squeegee blade for driving said squeegee blade alternately up and down within said track assembly, said motor rotates a drive arm thereby rotating a drive pin, said drive pin rotating a telescopic drive member said drive member telescopically extends in a vertical orientation so as to actuate downward movement of said squeegee blade across a facial surface of the side-view mirror.

6. A side-view mirror cleaning device comprising:
   a track assembly, said track assembly comprising a first track member, a second track member opposite said first track member, a jet support member mounted perpendicularly between said first track member and said second track member and provided for housing a pair of jets for delivering cleaning fluid to a surface of a mirror, and a lower member mounted perpendicularly between said first track member and said second track member and opposite to said jet support member, thereby forming a rectangular shaped track assembly;
   a pair of guide rollers, said pair of guide rollers comprising a first guide roller with a corresponding axle and a second guide roller with a corresponding axle and opposite to said first guide roller;
   a squeegee blade, said squeegee blade comprising a blade attachment segment having a first end and a second end, said first end having a first axle receiving slot for frictionally accommodating said axle of said first guide roller or said axle of said second guide roller, said second end having a second axle receiving slot for frictionally accommodating remaining said axle of said first guide roller or said axle of said second guide roller; said squeegee blade contacting a mirror surface in a horizontal orientation;

a motor for providing longitudinal movement of said squeegee blade, said motor housed with said jet support member; and a plurality of locking clamps, said plurality of locking clamps affixing a respective corner of said track assembly to a corner of said mirror.

7. The side-view mirror cleaning device of claim 6, wherein said track assembly is fabricated of rigid aluminum coated with an anti-corrosive material, thereby providing structural integrity and resistance to stress or weather-related damage.

8. The side-view mirror cleaning device of claim 6, wherein said pair of jets are mounted on a surface of said support member perpendicularly adjacent to said mirror surface.

9. The side-view mirror cleaning device of claim 6, wherein said first guide roller moves along an inside of said first track member, said second guide roller moves along an inside of said second track member, thereby allowing said first guide roller and said second guide roller to move said squeegee blade in a longitudinal manner.

10. The side-view mirror cleaning device of claim 6, wherein said blade attachment segment is a U-shaped segment comprising a diameter smaller than said axles, thereby allowing said first end and said second end of said blade attachment segment to frictionally couple to said axles.

11. The side-view mirror cleaning device of claim 6, wherein said motor further comprises:

a drive arm;

a drive pin, said drive pin perpendicularly coupled to said drive arm;

a telescopic drive member coupled with said drive pin;

a guide roller pin, said guide roller pin rotatably mounted between one of said guide rollers and said drive member; and a limit switch electrically coupled to said motor by wiring, thereby providing means for reversing said motor when said drive member contacts said limit switch.

12. The side-view mirror cleaning device of claim 6 further comprising a moisture sensor electrically coupled to said motor by wiring, wherein said sensor is adapted to be mounted on a rear outer surface of said mirror, said sensor configured to detect ambient moisture forming on said mirror surface thereby electrically commanding longitudinal movement of said squeegee blade and emission of cleaning fluid from said jets.

* * * * *